March 7, 1967 F. H. BAILLY 3,307,360
METHOD OF SUBSURFACE IRRIGATION AND SYSTEM THEREFOR
Filed May 11, 1964
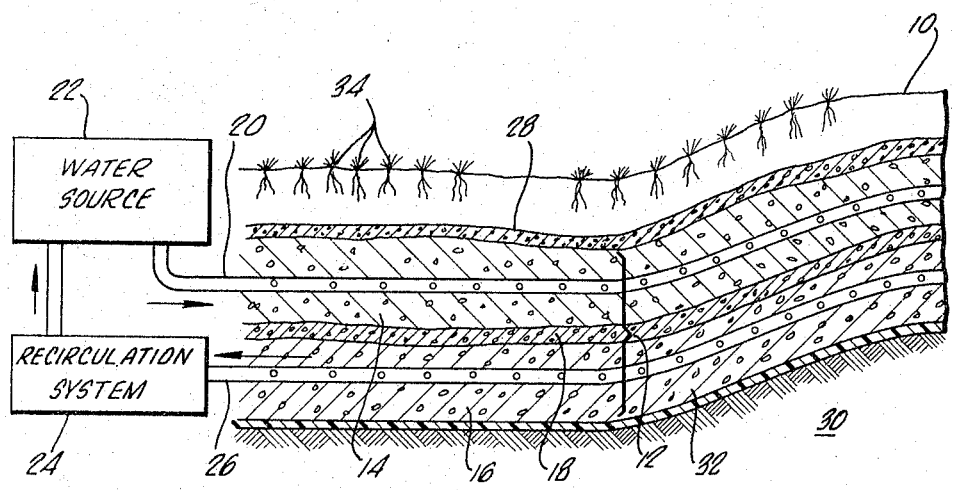
INVENTOR.
FLORENT H. BAILLY
BY
Christie, Parker & Hale
ATTORNEYS.

3,307,360
METHOD OF SUBSURFACE IRRIGATION AND SYSTEM THEREFOR

Florent H. Bailly, Arcadia, Calif., assignor to Variperm Company, Long Beach, Calif., a corporation of California
Filed May 11, 1964, Ser. No. 366,469
2 Claims. (Cl. 61—11)

This invention relates to a subsurface irrigation system which is characterized by a variable permeability layer disposed below the surface of a soil plot, which may be irrigated at any time while the plot is in use.

Areas such as golf courses, and particularly golf greens, have in the past been irrigated only during those times when players are not using the links. With the advent of night play and the increase in the number of golfers, the adequate irrigation of golf greens has been difficult.

Surface irrigation has only been a partial answer in the maintenance of golf greens, since extremely hot days adversely affect the health of the turf, which is further aggravated by golfers constantly walking on the greens throughout a day. It is uneconomical and contrary to the purpose of golf courses to terminate play for irrigation purposes for obvious reasons.

It is readily apparent that subsurface irrigation of any plot of ground has great merits not only in the ability to use the soil plot during irrigation, but also in the marked reduction of evaporation of the water during irrigation. There have been some previous subsurface irrigation systems which have been introduced, but with little merit, since the systems are not currently in use in those areas such as golf greens, which could and should be irrigated during the day.

In accordance with my invention, I have discovered a subsurface irrigation system which provides a variable permeable strata disposed below a layer of soil, which allows water to be absorbed into the layer of soil. Further, my invention is directed to a method of subsurface irrigation in which water is forced into a layer of high permeability material, allowing the water in the high permeability layer to be absorbed by the soil layer above it, and deterring the downward flow of water from the high permeability layer such that the water may be recirculated.

One feature of my invention is directed to a subsurface irrigation method and system which allows irrigation water to be recirculated, preventing loss of water which is especially attractive to water poor areas. Another feature of my invention is directed to a subsurface irrigation system which tends to leach out the salts within the soil to aid plant growth.

In terms of a method, the steps of my invention are: pumping water into a high permeability layer of concrete disposed below the surface of a plot of soil, irrigating the soil above the concrete layer by absorption and capillarity and deterring the movement of water downwardly from the concrete layer. The method extends to a recirculation system in which the water is pumped into the concrete layer and collected at a central point to be recirculated back to the concrete layer.

My invention extends to a subsurface irrigation system in which a variable permeability strata is located below the surface of soil. The strata includes a pair of high permeability layers of concrete sandwiching a low permeability layer, acting as a water loss retarder. The upper high permeability concrete layer operates as a water reservoir diffuser, and the lower concrete layer operates as a water drainage reservoir.

Preferably, a soil filter in the form of a low permeability concrete layer is disposed above the strata to prevent the soil from clogging the pores of the uppermost layer of high permeability concrete. A water impermeable film is located beneath the strata to reduce water loss. A water supply and recirculating system is connected to the high permeability layers of concrete.

The term "low permeability" and "high permeability" are, of course, arbitrary terms used to define properties of materials, and especially concrete. As used in this specification, the term "low permeability" means those materials which have a permeability less than about 500 darcies, and "high permeability" means those materials which have a permeability greater than about 500 darcies, extending up to and exceeding 2500 darcies.

It is difficult, if not impossible, to define the composition of a concrete after setting, and hence the usual practice is to define the concrete slurry composition, which, upon setting, results in a concrete of the property desired. A concrete especially usable with my invention comprises, as a slurry, cement, water, a first aggregate of a predetermined particle size distribution, a second aggregate of a predetermined particle size distribution differing from that of the first aggregate, and such as to result in a gap in the overall particle size distribution of the two aggregates, and a stabilizer which is preferably a pozzolanic material.

A stabilizer as used in this specification refers to materials used for the purpose of preventing or minimizing segregation of larger particles. This may be accomplished by finely divided materials, which, when distributed throughout a concrete slurry, increase the apparent viscosity without decreasing the pumpability of the mixture. The distribution of these fine particles and the improved consistency act to prevent segregation of the larger and heavier particles. There are many materials used in the industry for this purpose, but I have found that the pozzolanic materials are to be preferred in the concrete used in the present invention, because of the increase in compressive strength consequent upon successive use. A pozzolan is defined as any siliceous and aluminous material, natural or artificial, processed or unprocessed, which contains constituents not cementitious in themselves but which will, in finely divided form and in the presence of moisture, react with calcium hydroxide at ordinary temperatures to form relatively stable and water insoluble compounds possessing cementitious properties, i.e., setting up to a solid. Natural pozzolans may be derived from volcanic rocks and include pumicites or volcanic ashes, pumice or pumice stone, obsidian, scoria, tuffs and some of the andesites, or they may be derived from rocks in which the silica has a high opaline content including diatomites or diatomaceous earths, cherts, shale, clays and pure opal. Moreover, pozzolans include fly ash or flue dust, certain boiler and furnace slags, burnt ground brick and byproducts or certain industrial processes.

As disclosed in the patent to Mangold et al., Re. 24,570, the use of two aggregates of differing particle size in a concrete provide that the particle sizes leave a gap in the overall particle size distribution is very important in the concept of variable permeability in the concrete. The size gap should encompass a range of at least three or four mesh sizes, as for example the particle size range of seven to nine mesh inclusive. The omission of this particular range of aggregate particles results in a maximum resultant permeability. The permeability of the concrete may in fact be roughly predetermined by proper selection of the aggregate sizes, the omission of particles of smaller size than the above range resulting in a somewhat lower permeability. In general, as an example, a choice of a coarse aggregate in the range of six to ten mesh and a fine aggregate having a maximum particle size of about ten to twenty mesh, the two aggregates being selected such that there is a size range between the aggregates of at least three mesh size in which there are no aggregate particles.

My invention is best understood by reference to the accompanying drawing, which is a vertical cross section of a plot of ground in the drawing. A plot of soil 10 overlies a variable permeability strata 12 which includes two layers of high permeability material 14 and 16, sandwiching a single layer of low permeability material 18 between them. The layers of material are preferably formed from permeable concrete; however, the concept of this invention extends to other permeable materials which are evident to those skilled in the art.

A water inlet pipe 20, having a plurality of perforations therein, includes a series of connected lateral pipes (not shown), such that the entire layer 14 is saturated with water uniformly over its entire area when the pipe 20 is connected to a water source 22. Pipe 20 is also connected to a recirculation system 24 that includes a return pipe 26 that extends along the length of the lowermost layer 16. The return pipe 26 may include funnels (not shown) to help collect water in the layer 16. The recirculation system 24 may include a conventional water pump (not shown), such that water accumulated in the pipe 26 may be reintroduced into the inlet pipe 20, so that in water-poor areas, the cost of irrigation is minimized by the reuse of water not absorbed within the plot of soil 10. My invention is operable in any type of soil, such as sands, silt, sandy loam, clay, hardpan, and the like. In that type of soil which tends to plug the pores of the uppermost layer 14 in the strata 12, a permeable layer of soil filter 28, preferably in the form of a low permeability concrete, is disposed between the soil 10 and the strata 12. The soil filter 28 tends to prevent settling of the soil into the high permeability layer 14. I have found that fine particles of matter, such as silt in sandy loams, are particularly apt to clog the pores of the upper layer 14, and this condition is alleviated by the application of the soil filter 28.

The strata 12 is normally disposed on a plot of undisturbed ground 30, having a permeability which varies from a few darcies to less than one millidarcy. Some water which finds its way into the lowermost layer 16 of the strata 12 can migrate into the undisturbed ground 30, thus reducing the efficiency of the recirculation system. For this purpose a layer of water impermeable material 32 is disposed beneath the strata 12, and is preferably formed from a plastic sheet such as polyethylene film.

Plants 34, having their roots extending downwardly into the soil 10, are irrigated by forcing water under pressure through the pipe 20, so the uppermost high permeable layer 14 is saturated to provide a bed of water bearing material adjacent to the soil. Due to pressure and capillarity, water is absorbed by the soil 10, thus feeding the roots of the plants 34 at the lowermost extremities of the plants, considered by some botanist to be the better manner of watering plant life. It is recognized that the soil filter 28 may impede the passage of water upwardly into the soil 10, and for this reason, the thickness of this layer is kept to a minimum. A portion of the water, which does not enter the soil 10, migrates through the low permeability layer 18 and is recovered within the lowermost layer 16, and enters the return pipe 26 to flow within the recirculation system 24. An inherent advantage of my invention includes the leaching of the salts within the soil 10, and the salts may be removed from the return water at the recirculation system by an ion exchange apparatus, such as zeolite, or other conventional systems.

The following tables set forth the various ingredients of a slurry of permeable concrete, which is preferably used for the individual layers used in my invention. Table 1 lists the components, which is preferably used in the soil filter 28, and is preferably deposited in a layer of ¼" to 1" thick. Table 2 discloses the components of a high permeability concrete preferably used in the uppermost layer 14 of the strata 12, and is preferably deposited in a layer of 4" to 9" thick. Table 3 discloses a low permeability concrete preferably used in the sandwiched layer 18 of the strata 12, and is preferably deposited in a layer 2" to 4" thick. Table 4 discloses the components of the high permeability layer 16 and preferably has a thickness of 3" to 12".

TABLE I

| Component: | Permissible range in parts by weight |
|---|---|
| Cement | 1 |
| Water | 1.5 to 2.5 |
| Pozzolan (stabilizer) | 0.10 to 0.40 |
| Aggregate: | |
| (a) 16 mesh or 24 mesh | 1.0 to 2.0 |
| and | |
| (b) 12 mesh or 14 mesh | 4.0 to 7.0 |

A concrete having a slurry composition as indicated in the above table will have a permeability of 250 darcies or less in the set state.

TABLE II

| Component: | Permissible range in parts by weight |
|---|---|
| Cement | 1 |
| Water | 1.5 to 2.5 |
| Pozzolan (stabilizer) | 0.10 to 0.40 |
| Aggregate: | |
| (a) 8 mesh or 9 mesh | 1.0 to 2.0 |
| and | |
| (b) 5 mesh or 6 mesh | 4.0 to 7.0 |

A concrete having a slurry composition as indicated in the above table will have a permeability varying from 800 to 1100 darcies in the set state.

TABLE III

| Component: | Permissible range in parts by weight |
|---|---|
| Cement | 1 |
| Water | 1.5 to 2.5 |
| Pozzolan (stabilizer) | 0.10 to 0.40 |
| Aggregate: | |
| (a) 14 mesh or 16 mesh | 1.0 to 2.0 |
| and | |
| (b) 10 mesh or 12 mesh | 4.0 to 7.0 |

A concrete having a slurry composition as indicated in the above table will have a permeability of 250 to 450 darcies in the set state.

TABLE IV

| Component: | Permissible range in parts by weight |
|---|---|
| Cement | 1 |
| Water | 1.5 to 2.5 |
| Pozzolan (stabilizer) | 0.10 to 0.40 |
| Aggregate: | |
| (a) 7 mesh or 8 mesh | 1.0 to 2.0 |
| and | |
| (b) 4 mesh or 5 mesh | 4.0 to 7.0 |

A concrete having a slurry composition in the above table will have essentially a permeability of 1700 to 2300 darcies in the set state.

A preferred method of compounding each slurry set forth in Tables I, II, III, and IV involves the steps:

(1) Thoroughly mix the dry cement and pozzolan. This pre-mix of the stabilizer and cement is important because of the fine particle size of each, which makes even distribution difficult with wet material.

(2) Thoroughly mix the cement-stabilizer mixture with aggregate.

(3) Add the required amount of water and mix the entire slurry.

The various layers of concrete may be monolithically installed or alternatively may be precast in individual blocks or other geometric shapes, and thereafter installed much in the same manner as bricks into a wall or other structural form. A particular manner of installing an irrigation system according to my invention is not limited in any particular manner, and is within the skill of any ordinary artisan.

The invention thus far has been described particularly with relation to golf greens and their subsurface irrigation. Such areas as gardens, parks, baseball stadiums and other places of interest which have great quantities of people viewing them, especially during the warmer summer months, also use such an irrigation system with its attendant advantages.

I claim:

1. A subsurface irrigation system for a plot of soil comprising:
   strata of variable permeability layers disposed below the surface of the soil,
   the strata including a first layer of low permeability concrete,
   the strata including two layers defining an uppermost layer and a lowermost layer of high permeability concrete sandwiching the low permeability concrete, the said two layers having a permeability higher than the said first layer,
   a source of water directed toward the uppermost layer of concrete,
   a water collecting device engaged with the lowermost layer of concrete, and
   a means for recirculating water operatively engaged to the water source and the water collecting device.

2. A method of subsurface irrigation of soil comprising:
   pumping water into a first layer of permeable material disposed below the surface of soil,
   irrigating a layer of soil above the first layer of permeable material by absorption,
   inhibiting the movement of the water downwardly from the first layer by a second layer of lower permeability disposed below and contiguous to the first layer, and
   draining excess water passing through the lower permeability layer via a third layer of material therebeneath, contiguous therewith and of higher permeability than the second layer.

References Cited by the Examiner

UNITED STATES PATENTS

| | | | |
|---|---|---|---|
| 728,088 | 5/1903 | Dillon | 61—13 |
| 1,171,558 | 2/1916 | Taylor | 47—1 |
| 1,171,559 | 2/1916 | Taylor | 47—1 |
| 1,401,386 | 12/1921 | Woodberry | 61—13 |
| 2,067,356 | 1/1937 | Swinhoe | 61—13 |
| 2,075,590 | 3/1937 | North | 61—13 |

EARL J. WITMER, *Primary Examiner.*